United States Patent
Joergl et al.

(10) Patent No.: US 8,056,338 B2
(45) Date of Patent: Nov. 15, 2011

(54) RE-INTRODUCTION UNIT FOR LOW-PRESSURE EXHAUST GAS RECIRCULATION CONDENSATE AT OR BEFORE COMPRESSOR

(75) Inventors: Volker Joergl, Ortonville, MI (US); Timm Kiener, Lake Orion, MI (US); Olaf Weber, Bloomfield Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 751 days.

(21) Appl. No.: 12/087,282

(22) PCT Filed: Jan. 26, 2007

(86) PCT No.: PCT/US2007/002142
§ 371 (c)(1),
(2), (4) Date: Jun. 30, 2008

(87) PCT Pub. No.: WO2007/089567
PCT Pub. Date: Aug. 9, 2007

(65) Prior Publication Data
US 2009/0000297 A1    Jan. 1, 2009

Related U.S. Application Data

(60) Provisional application No. 60/762,623, filed on Jan. 27, 2006.

(51) Int. Cl.
*F02B 33/44* (2006.01)
*F02M 25/07* (2006.01)

(52) U.S. Cl. .............. 60/605.2; 123/568.11; 123/568.12

(58) Field of Classification Search ............... 60/605.2; 123/568.11, 568.12; F02M 25/07, 35/10
See application file for complete search history.

(56) References Cited

U.S. PATENT DOCUMENTS

| | | | | |
|---|---|---|---|---|
| 3,866,585 A * | 2/1975 | Kopa | ........................ | 123/568.15 |
| 4,327,698 A * | 5/1982 | Hamai et al. | ............. | 123/568.17 |
| 5,657,630 A * | 8/1997 | Kjemtrup et al. | ........... | 60/605.2 |
| 5,771,868 A | 6/1998 | Khair | ........................ | 60/605.2 |
| 6,301,887 B1 * | 10/2001 | Gorel et al. | ................... | 60/605.2 |
| 6,800,115 B2 * | 10/2004 | Eimer | .............................. | 95/215 |
| 6,886,336 B2 | 5/2005 | Super et al. | ................... | 60/605.2 |
| 6,899,090 B2 | 5/2005 | Arnold | ........................ | 60/605.2 |
| 2004/0255582 A1 | 12/2004 | Sumser et al. | ............... | 60/605.1 |
| 2005/0066659 A1 | 3/2005 | Super et al. | ................... | 60/605.2 |
| 2008/0028757 A1* | 2/2008 | Eitel et al. | ........................ | 60/311 |
| 2009/0071150 A1* | 3/2009 | Joergl et al. | ................... | 60/605.2 |
| 2009/0151915 A1* | 6/2009 | Short | ........................... | 165/165 |
| 2009/0241515 A1* | 10/2009 | Cardno | ........................... | 60/278 |

(Continued)

FOREIGN PATENT DOCUMENTS

DE 19625449 11/1997

(Continued)

*Primary Examiner* — Thai Ba Trieu
(74) *Attorney, Agent, or Firm* — Warn Partners, P.C.

(57) ABSTRACT

The present invention is an exhaust gas recirculation system for a motor vehicle, having a turbocharger unit (18) which has a turbine (20) and a compressor (36), the compressor (36) having a compressor wheel (42) which rotates on an axis (66). There is also a dispersion apparatus (56) operably associated with a condensation separation apparatus (58). The condensation separation apparatus (58) separates moisture from exhaust gas flowing from the turbine (20), and the dispersion apparatus (56) reintroduces the moisture into the compressor (36) in proximity to the compressor wheel axis (66), preventing erosion of the compressor wheel (42).

22 Claims, 3 Drawing Sheets

U.S. PATENT DOCUMENTS

2010/0037871 A1 * 2/2010 Sauter et al. ............. 123/568.11
2010/0293943 A1 * 11/2010 Teng et al. ............... 123/568.11

FOREIGN PATENT DOCUMENTS

| DE | 102008045479 A1 | * | 3/2010 |
| GB | 2018358 | | 10/1979 |
| GB | 2236940 | | 8/1993 |
| JP | 09324707 A | * | 12/1997 |
| JP | 10068358 | | 3/1998 |
| JP | 2001132442 A | * | 5/2001 |
| JP | 2001132555 A | * | 5/2001 |
| JP | 2002221104 A | * | 8/2002 |
| JP | 2005256679 A | * | 9/2005 |
| JP | 2006274961 A | * | 10/2006 |
| JP | 2009108716 A | * | 5/2009 |
| JP | 2009150281 A | * | 7/2009 |
| SU | 1134756 A | * | 1/1985 |

* cited by examiner

US 8,056,338 B2

RE-INTRODUCTION UNIT FOR LOW-PRESSURE EXHAUST GAS RECIRCULATION CONDENSATE AT OR BEFORE COMPRESSOR

CROSS-REFERENCE TO RELATED APPLICATIONS

This application is a National Stage of International Application No. PCT/2007/002142, filed Jan. 26, 2007. This application claims the benefit of U.S. Provisional Application No. 60/762,623, filed Jan. 27, 2006. The disclosures of the above applications are incorporated herein by reference.

TECHNICAL FIELD

The present invention relates to an exhaust gas recirculation (EGR) valve assembly used with a turbocharger unit. More particularly, the reintroduction of EGR condensate into recirculated exhaust gas such that the droplets cannot harm the compressor wheel of the turbocharger unit.

BACKGROUND OF THE INVENTION

Turbocharging units are a commonly used way to increase the power of an engine, both With conventional internal combustion engines, and Diesel engines. Turbochargers are comprised of a turbine, and a compressor. The turbine receives exhaust gas from the exhaust manifold of the engine, and the turbine wheel located inside the turbine rotates, powering a compressor wheel inside the compressor. The compressor forces high-pressure air into the intake manifold of the engine, increasing power output.

Due to increased environmental concerns, an emphasis has been placed on reducing the amount of exhaust gas emissions of both internal combustion engines and diesel engines. One method that has been used to reduce exhaust gas emissions has been to reintroduce the exhaust gas into the intake manifold of the engine, reducing the amount of exhaust gas released into the atmosphere. This is commonly achieved through the use of an EGR valve.

Current and future emission requirements for diesel engines in Europe, the U.S., and most foreign markets require engine concepts capable of delivering high EGR-rates at very low vehicle loads/speeds. One way of providing these EGR-rates is by using low pressure EGR. However, exhaust gas can contain a high amount of water vapor, dependent on the humidity of the air and the fuel quantity burned in the combustion chamber of the engine. The path the exhaust gas flows through, also called the EGR path, is comprised of the turbocharger, a particulate filter, an exhaust pipe, an EGR path having an EGR valve, a low-pressure EGR path having a low pressure EGR valve, and a low pressure EGR cooler. While the water vapor passes through the EGR path, at certain driving conditions such as cold ambient temperature, or low engine loads and therefore low exhaust temperatures after a cold start, the water vapor cools down below its dew point temperature and droplets are formed. These droplets of different aerodynamic radii pass through the EGR path, the low-pressure EGR path, the low pressure EGR cooler, and into the intake pipe in front of the rotating compressor wheel, also called the mixing area.

One major problem caused by the droplets coming into contact with the compressor wheel is that these droplets that are formed can lead to massive droplet erosion on the compressor wheel. One way to keep droplets from hitting the compressor wheel in a critical area is to have the droplets permanently removed from the flow of exhaust gas going into the compressor wheel under all driving conditions. It is very difficult to permanently remove the condensate from the intake side because of the negative pressure drop to atmosphere (pumping would be necessary). Also humidity in the intake air is a positively influencing parameter for in-cylinder NOx reduction.

Another way to keep droplets from hitting the compressor wheel area is to temporarily separate the condensate from the gas flow, and then re-introduce the liquid condensate into the exhaust gas in an area to avoid corrosion of the blades on the compressor wheel. This is difficult because dispersion of liquid condensate can cause damage to the compressor wheel blades.

Accordingly, an object of the present invention is to bring the water vapor or condensate from the exhaust gas of the engine into close contact with the compressor wheel in an area of low blade speed to prevent erosion of the compressor wheel.

SUMMARY OF THE INVENTION

One of the ways to avoid erosion on the compressor wheel due to the droplets is to spread the droplets out over the whole cross-sectional area of the inlet pipe in the mixing area. Spreading the droplets is dependent upon the speed and load point, as well as the mass flow of the exhaust gas. The droplets move into the compressor wheel with a certain speed within the pipe.

The droplets may also be driven to the outer perimeter of the pipe by swirl. The droplets can then hit the compressor wheel over the whole cross-sectional area. The impulse of the droplets in combination with the impulse of the compressor wheel (in which the impulse of the wheel increases with the speed of the wheel) can cause massive damage to the compressor wheel surface area. These problems are usually, but not only, seen in the areas of high impact speed near the outer tips of the compressor wheel blades, where the diameter of the compressor wheel is largest.

The present invention is an EGR system for a motor vehicle, having a turbocharger unit which has a turbine and a compressor, the compressor having a compressor wheel which rotates on an axis. There is also a dispersion apparatus operably associated with a condensation separation apparatus. The condensation separation apparatus separates moisture from exhaust gas flowing from the turbine, and the dispersion apparatus reintroduces the moisture into the compressor in proximity to the compressor wheel axis, preventing erosion of the compressor wheel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
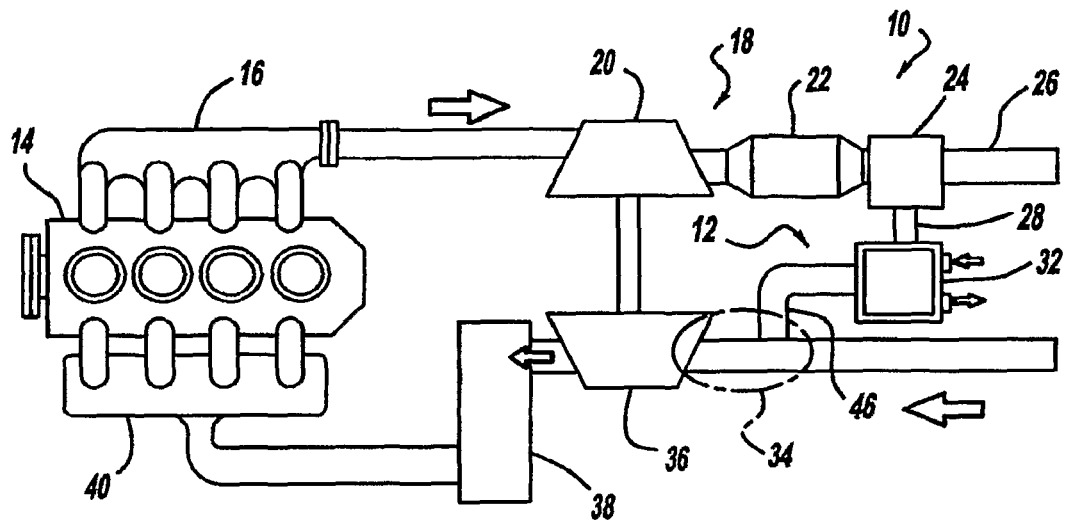
FIG. 1 is a diagram of an engine having a turbocharging unit, according the present invention.

FIG. 1 is a schematic view of a diesel engine breathing system incorporating the present invention, generally shown at 10. As will be described herein, such a system has a low pressure EGR loop, generally shown at 12. Exhaust gas is generated by an engine 14 and exits through an exhaust manifold 16. The exhaust gas from the exhaust manifold 16 passes through the turbine 20 and is then introduced to a diesel particulate filter (DPF) 22 where the exhaust gas is cleaned of soot material. After going through the DPF 22, the exhaust gas will then flow to an EGR valve module 24 where the exhaust gas is split between flowing into an exhaust pipe 26, where the exhaust gas leaves the vehicle, or into a low-pressure EGR loop 12, where the exhaust gas will be reintroduced back into the engine 14 for combustion.

The exhaust gas that flows into the low-pressure EGR loop 12 will flow into an EGR path 28, and will pass through a low pressure EGR cooler 32 that cools the temperature of the exhaust gas prior to re-combustion. The exhaust gas exits the low pressure EGR cooler 32, passes through a first passageway or low pressure EGR tube 46, mixes with air in a mixing area and is introduced to a compressor 36, which pressurizes both exhaust gas and outside air for introduction to the engine 14. The mixing area has a mixing apparatus 34 that removes condensation from the exhaust gas and reintroduces the condensation at a specific location at the compressor 36. The mixed intake gas is then passed through a charge air cooler 38 into an intake manifold 40, which then delivers the mixed intake gas to the engine 14.

Figure 2:
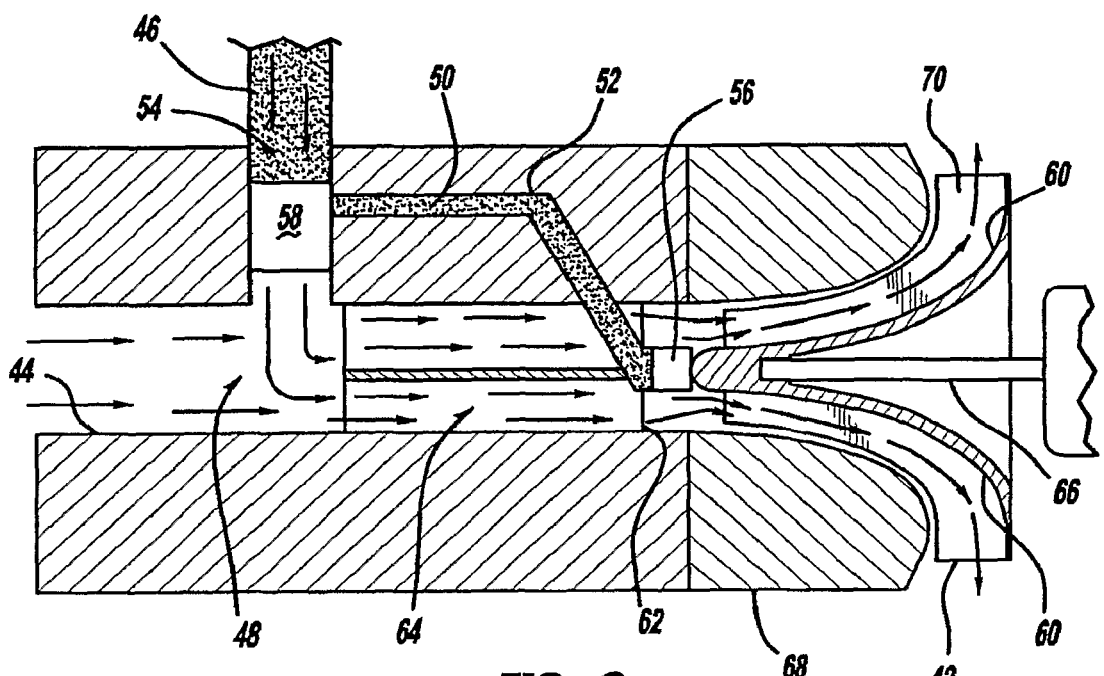
FIG. 2 is a side view of an assembly according to a first embodiment of the present invention.

In a first embodiment of the present invention, shown in FIG. 2, the mixing apparatus 34 is shown in greater detail. The mixing apparatus 34 includes, but is not limited to, a condensation separation apparatus 58, a transporting pipe 52 and a dispersion apparatus 56. The mixing apparatus 34 can have many configurations which will now be discussed.

Disposed within the EGR tube 46 is the condensation separation apparatus 58, which is connected to the second passageway, or transporting pipe 52. The condensation separation apparatus 58 can be a ring catch, a separator, or a centrifugal groove. The EGR tube 46 is connected to a third passageway, or intake tube 44, and is the same EGR tube 46 shown in FIG. 1. The intake tube 44 is connected to a compressor housing 68; inside the compressor housing 68 is a compressor wheel 42, which is mounted for rotation on a compressor wheel shaft 66, which forms a compressor wheel axis. The transporting pipe 52 is connected to the dispersion apparatus 56, which is mounted in front of the compressor wheel 42, and is connected to either the intake tube 44 or compressor housing 68.

In operation, the exhaust gas with droplets 54 flows through the EGR-tube 46 and through the condensation separation apparatus 58. Air from the atmosphere flows through the intake tube 44 toward the compressor wheel 42. The condensation separation apparatus 58 removes the droplets or liquid condensate 50 from the exhaust gas with droplets 54, forming an exhaust gas and air mixture, generally shown at 64, in a mixing area, generally shown at 48. The condensate 50 is transported from the condensation separation apparatus 58 through the transporting pipe 52 to the dispersion apparatus 56. Once the condensate 50 reaches the dispersion apparatus 56, the condensate 50 is dispersed in an area of low circumferential speed by the dispersion apparatus 56 aligned with the compressor wheel shaft 66.

The dispersion apparatus 56 has the purpose to move the condensate 50 onto the blades 70 in a way to prohibit large droplets from again being created in the mass flow of condensate 50, and the exhaust gas and air mixture 64 onto the compressor wheel 42. It should be noted that the condensate 50 could also flow through the transporting pipe 52 and drip pressureless onto the compressor wheel 42 in an area of low circumferential speed without the use of a dispersion apparatus 56.

Once the condensate 50 reaches the compressor wheel 42, the condensate 50 is accelerated on the compressor wheel 42 and transformed into a liquid film 60.

Because the liquid film 60 is accelerated on the wheel 42, droplet erosion is prevented because the impact of the condensate 50 hitting the wheel 42 is significantly reduced, if not eliminated. The transporting pipe 52 is designed aerodynamically to not disturb the flow in front of the compressor wheel 42. Good alignment with the compressor wheel 42 makes a close coupled mounting of the transporting pipe 52 to the compressor wheel 42 necessary. This can be done by using fins 62 right in front of the compressor wheel 42 to connect the transporting pipe 52 to the intake tube 44 in front of the compressor wheel 42 or to the compressor housing 68 in front of the compressor wheel 42.

The dispersion apparatus 56 and the condensation separation apparatus 58 can also be mounted in other areas and have the same effect of dispersing the condensate 50 to the blades 70 while not allowing droplets to be reformed in the mass flow of the exhaust gas and air mixture 64 within the compressor wheel 42. The condensation separation apparatus 58 can take the form of a ring catch, a separator, or a centrifuge.

Figure 3:
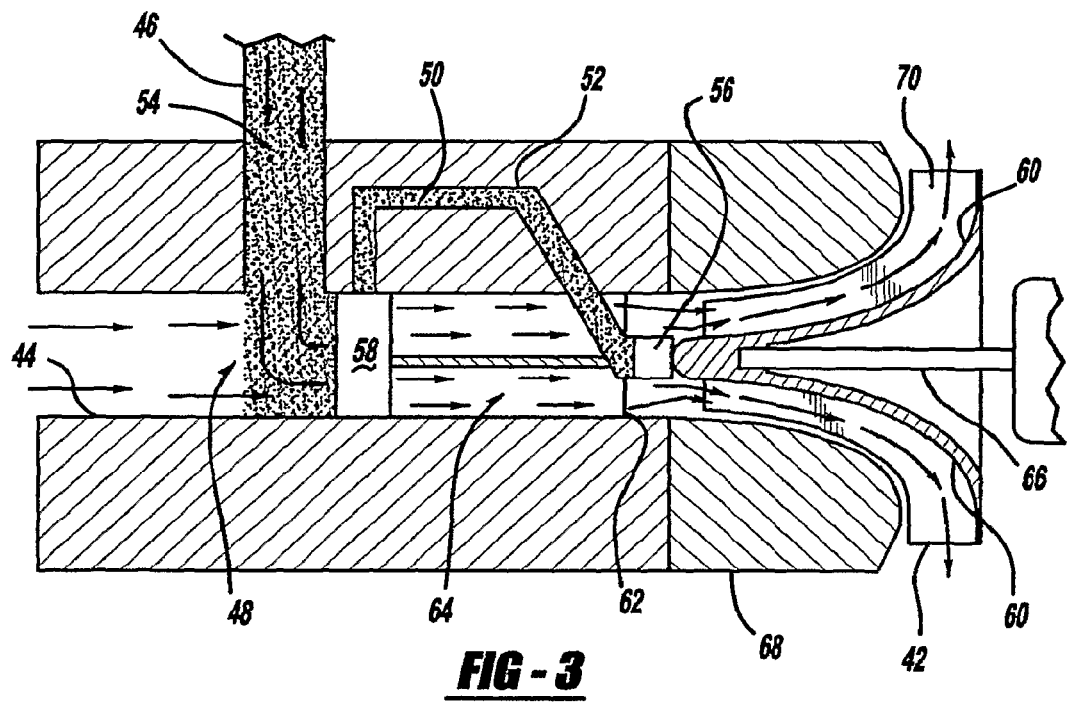
FIG. 3 is a side view of the assembly according to a second embodiment of the present invention.

Another embodiment is shown in FIG. 3. In this embodiment, the condensation separation apparatus 58 is mounted in the intake tube 44. The condensation separation apparatus 58 performs the same function of removing the condensate 50 from the mixture 64 going to the compressor wheel 42 when mounted in the intake tube 44, or the EGR tube 46, as previously disclosed. The condensation separation apparatus 58 can be positioned within the intake to collect condensate 50 from the inside of the tube 44. In this embodiment, the dispersion apparatus 56 is still aligned with the compressor wheel shaft 66, and works in the same manner as described in FIG. 2.

Figure 4:
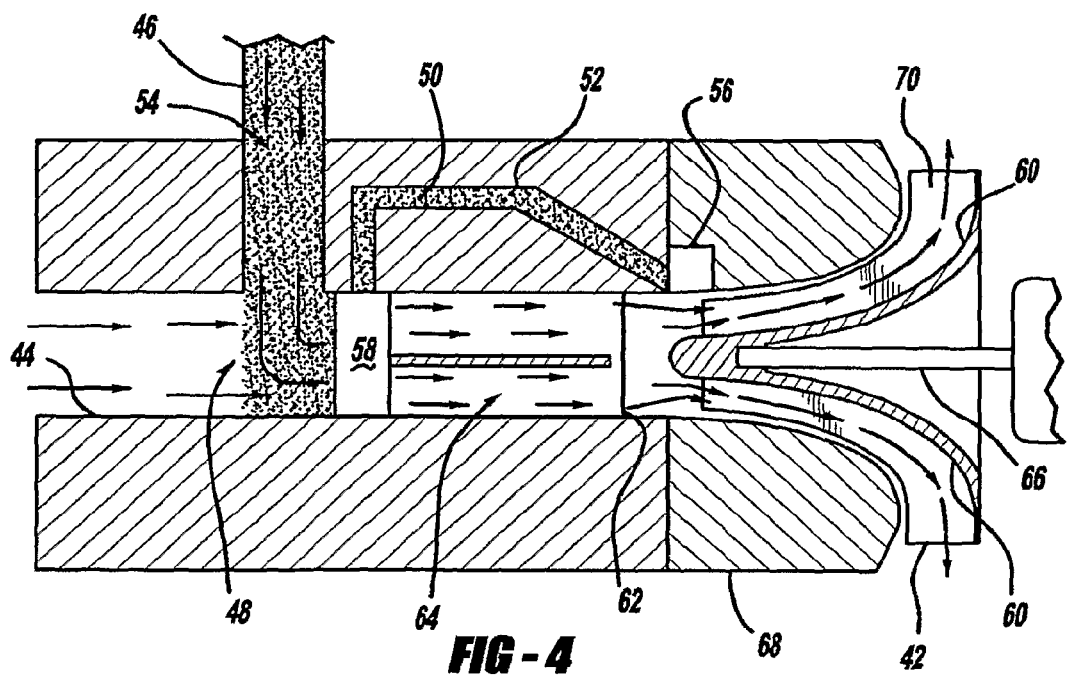
FIG. 4 is a side view of the assembly according to a third embodiment of the present invention.

Another embodiment of the present invention is shown in FIG. 4. In this embodiment, the condensation separation apparatus 58 is located in the intake tube 44, and the dispersion apparatus 56 is mounted to the compressor housing 68. The droplets can be kept from hitting the compressor wheel 42 in a critical area by using a dispersion apparatus 56 to bring the condensate 50 to the circumferential area of the compressor housing 68. The principle of this type of reintroduction is to break down the condensate 50 and then mix the condensate 50 with the mixture 64 near the compressor wheel 42, such that the condensate 50 does not hit the blades 70, but becomes a thin wall film 72 that is pulled into the compressor wheel 42. This principle can be used independently of the condensation separation apparatus 58.

Figure 5:
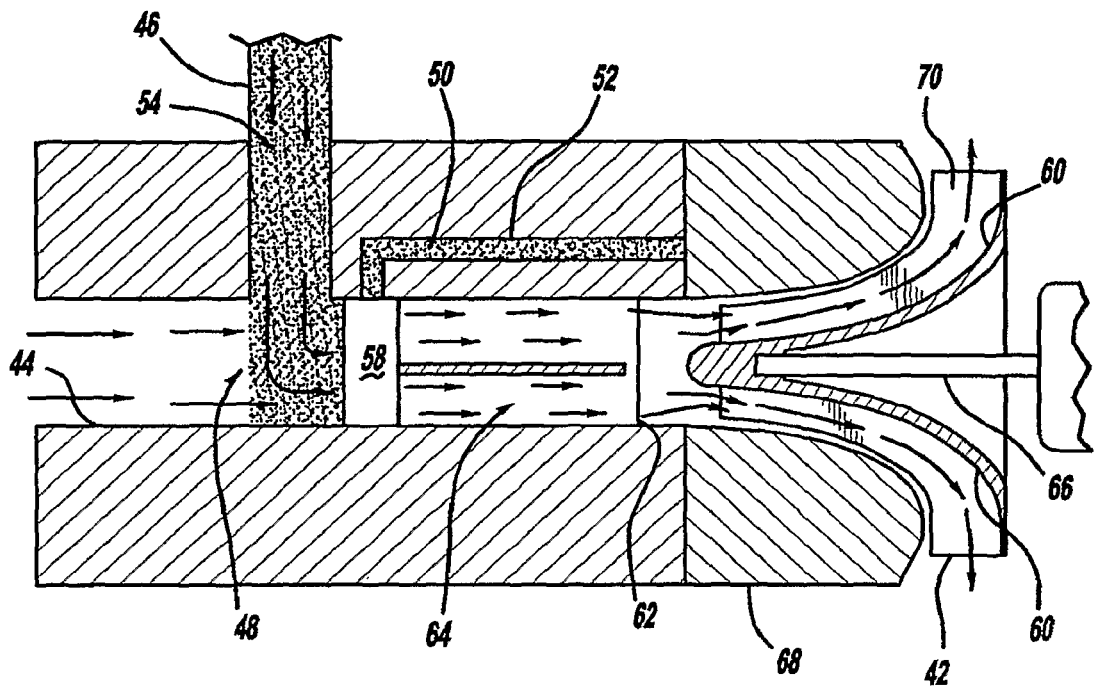
FIG. 5 is a side view of the assembly according to a fourth embodiment of the present invention.

Another embodiment of the present is shown in FIG. 5. In this embodiment, the condensation separation apparatus 58 is located in the intake tube 44, and the dispersion apparatus 56 has been eliminated. The embodiment disclosed in FIG. 5 shows how the condensate 50 is kept from hitting the compressor wheel 42, in a critical area is by using the transporting pipe 52 to bring the condensate 50 to a back plate area of the compressor wheel 42 by passing the condensate 50 around the compressor wheel 42 through the compressor housing 68. There, the condensate 50 is introduced and cannot harm the blades 70.

Figure 6:
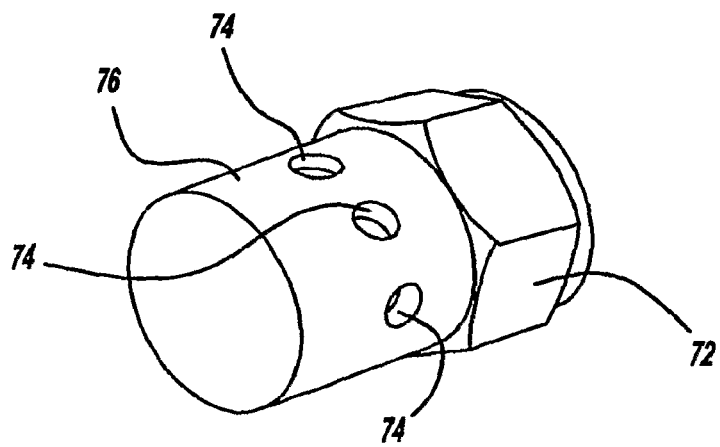
FIG. 6 is a perspective view of the dispersion apparatus.

The dispersion apparatus 56 can take the form of a threaded nut 72 shown in FIG. 6, or a threaded cone. The threaded nut 72 has a series of apertures 74 located on an extension 76 for distributing the condensate 50. As the condensate 50 moves through the transport pipe 52 to the threaded nut 72, pressure builds inside the threaded nut 72, forcing the condensate 50 through each of the series of apertures 74. The threaded nut 72 is rotatably connectable to the compressor wheel shaft 66. The rotation of the threaded nut 72 contributes the flow of the condensate 50 out of the threaded nut 72. The threaded nut 72 is just one example of how to disperse the condensate. Many other variations can be used. It is possible for the dispersion apparatus to be a rotating rough surface that the condensate comes into contact with. It is also possible for the dispersion apparatus described herein to be not connected with the compressor wheel.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An exhaust gas recirculation arrangement for a motor vehicle, comprising:
    a compressor wheel for pressurizing air flow to an intake of an engine;
    an exhaust gas recirculation tube for delivering exhaust gas to said compressor wheel;
    an intake tube for introducing air or a fluid mixture of air and exhaust gas to said compressor wheel; and
    a mixing apparatus operably associated with said compressor wheel and said exhaust gas recirculation tube, wherein said mixing apparatus separates droplets from said exhaust gas and reintroduces said droplets onto said compressor wheel such that erosion of the compressor wheel is prevented.

2. The exhaust gas recirculation arrangement for a motor vehicle of claim 1, wherein said mixing apparatus is located in said exhaust gas recirculation tube and is connectable to a transporting pipe that delivers said droplets to said compressor wheel.

3. The exhaust gas recirculation arrangement for a motor vehicle of claim 1 wherein said mixing apparatus includes a dispersion apparatus and a condensation separation apparatus, wherein said dispersion apparatus is placed in fluid connection with said condensation separation apparatus and said droplets are delivered from said condensation separation apparatus to said dispersion apparatus, wherein said dispersion apparatus disperses said droplets onto said compressor wheel such that erosion of said compressor wheel is prevented.

4. The exhaust gas recirculation arrangement for a motor vehicle of claim 3, wherein said dispersion apparatus is a threaded nut or threaded cone that rotates and disperses condensate.

5. The exhaust gas recirculation arrangement for a motor vehicle of claim 3, wherein said dispersion apparatus is aligned with said compressor wheel at an area of low circumferential speed of said compressor wheel.

6. The exhaust gas recirculation arrangement for a motor vehicle of claim 3, wherein said dispersion apparatus is mounted to said compressor wheel housing.

7. The exhaust gas recirculation arrangement for a motor vehicle of claim 3, wherein said condensation separation apparatus is one selected from the group comprising a ring catch, a separator, or a centrifugal groove.

8. The exhaust gas recirculation arrangement for a motor vehicle of claim 1, wherein said mixing apparatus is partially located in said intake tube.

9. An exhaust gas recirculation arrangement for re-introducing condensate generated in exhaust gas from an engine into a compressor of a turbocharger, comprising:
    a turbocharger unit having a turbine and a compressor;
    a compressor wheel axis located in said compressor;
    a first passageway for delivering exhaust gas from a low pressure exhaust gas recirculation path to said compressor;
    a condensation separation apparatus for removing condensate from said exhaust gas, wherein said condensation separation apparatus separates said condensate from said exhaust gas, delivers said condensate to a dispersion apparatus, and said dispersion apparatus disperses said condensate onto said compressor wheel;
    a second passageway connected to said condensation separation apparatus for transferring said condensate to the dispersion apparatus; and
    a third passageway connected to said first passageway having an end open to atmosphere for air intake to said compressor.

10. The exhaust gas recirculation arrangement of claim 9, wherein said condensation separation apparatus is located in said third passageway, and said condensate is transferred from said condensation separation apparatus through said second passageway, through said compressor wheel housing and around said compressor wheel to a back plate area of said compressor wheel, preventing erosion of said compressor wheel.

11. The exhaust gas recirculation arrangement of claim 9, wherein said condensation separation apparatus is located in said first passageway, and said dispersion apparatus is mounted on said rotational axis of said compressor wheel, displacing said condensate onto said compressor wheel so as to avoid erosion of said compressor wheel.

12. The exhaust gas recirculation arrangement of claim 9, wherein said condensation separation apparatus is located in said first passageway, and said dispersion apparatus is mounted in said third passageway in proximity to said compressor wheel axis displacing said condensate onto said compressor wheel so as to avoid erosion of said compressor wheel.

13. The exhaust gas recirculation arrangement of claim 9, wherein said condensation separation apparatus is located in said first passageway, and said dispersion apparatus is mounted onto said compressor wheel housing in proximity to said compressor wheel axis, dispersing said condensate onto said compressor wheel so as to avoid erosion of said compressor wheel.

14. The exhaust gas recirculation arrangement of claim 9, wherein said condensation separation apparatus is located in said first passageway, and said dispersion apparatus is mounted onto said compressor wheel housing in proximity to said compressor wheel axis, and used to introduce said condensate to a circumferential area of said compressor wheel housing, avoiding erosion of said compressor wheel.

15. The exhaust gas recirculation arrangement of claim 9 wherein said dispersion apparatus is aligned with said compressor wheel at an area of low circumferential speed of said compressor wheel.

16. The exhaust gas recirculation arrangement of claim 9, wherein said condensation separation apparatus is located in said third passageway, and said dispersion apparatus is mounted in said third passageway in proximity to said compressor wheel axis, displacing said condensate onto said compressor wheel so as to avoid erosion of said compressor wheel.

17. The exhaust gas recirculation arrangement of claim 9, wherein said condensation separation apparatus is located in said third passageway, and said dispersion apparatus is mounted onto said compressor wheel housing in proximity to said compressor wheel axis, displacing said condensate onto said compressor wheel so as to avoid erosion of said compressor wheel.

18. The exhaust gas recirculation arrangement system of claim 9, wherein said condensation separation apparatus is located in said third passageway, and said dispersion apparatus is mounted onto said compressor wheel housing in proximity to said compressor wheel axis, and used to introduce said condensate to a circumferential area of said compressor wheel housing, avoiding erosion of said compressor wheel.

19. The exhaust gas recirculation arrangement of claim 18, wherein said compressor further comprises a compressor wheel housing for enclosing said compressor wheel, and a back plate area disposed in said compressor wheel housing.

20. The exhaust gas recirculation arrangement of claim 19, wherein said condensate is brought from said condensation separation apparatus through said second passageway, through said compressor wheel housing and around said compressor wheel to said back plate area of said compressor wheel, preventing erosion of said compressor wheel.

21. The exhaust gas recirculation arrangement of claim 9, said condensation separation apparatus is one selected from the group comprising a ring catch, a separator, or a centrifugal groove.

22. The exhaust gas recirculation arrangement of claim 9, said dispersion apparatus is one selected from the group comprising a threaded nut or a threaded cone.

* * * * *